United States Patent
Soliman (12)

(10) Patent No.: US 6,671,291 B1
(45) Date of Patent: Dec. 30, 2003

(54) METHOD AND APPARATUS FOR SEQUENTIALLY SYNCHRONIZED NETWORK

(75) Inventor: Samir S. Soliman, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/360,491

(22) Filed: Jul. 21, 1999

(51) Int. Cl.$^7$ ................................................. H04L 7/00
(52) U.S. Cl. ...................................... 370/503; 370/519
(58) Field of Search ................................ 370/320, 335, 370/342, 479, 519, 503, 350; 375/130, 145, 354, 355, 356

(56) References Cited

U.S. PATENT DOCUMENTS

| | | |
|---|---|---|
| 4,317,220 A | 2/1982 | Martin |
| 4,718,109 A * | 1/1988 | Breeden ..................... 455/51 |
| 4,912,773 A * | 3/1990 | Schiff ......................... 455/71 |
| 5,550,873 A * | 8/1996 | Dolev et al. ............... 375/354 |
| 6,014,376 A * | 1/2000 | Abreu et al. ............... 370/350 |
| 6,016,322 A * | 1/2000 | Goldman .................... 370/508 |
| 6,052,363 A * | 4/2000 | Koch .......................... 370/252 |
| 6,134,234 A * | 10/2000 | Kapanen ..................... 370/350 |
| 6,185,217 B1 * | 2/2001 | Ando et al. ................. 370/403 |
| 6,373,834 B1 * | 4/2002 | Lundh et al. ............... 370/350 |

FOREIGN PATENT DOCUMENTS

| | | |
|---|---|---|
| EP | 0903873 A1 | 3/1999 |
| FR | 2744864 | 2/1996 |
| WO | 94/28643 | 12/1994 |

* cited by examiner

*Primary Examiner*—Kenneth Vanderpuye
(74) *Attorney, Agent, or Firm*—Philip Wadsworth; Kent Baker; Bruce W. Greenhaus

(57) ABSTRACT

A method and apparatus for sequentially synchronized timing and frequency generation in a communication network includes a parent station for maintaining system time and frequency values, a time/frequency transfer unit for receiving and demodulating the system time and frequency values from the parent station and generating corrected system time and frequency values by adjusting a clock and the center frequency of a pilot signal at a child station to remove time and frequency discrepancies, and a child station to which the time/frequency transfer unit directly communicates the corrected system time and frequency values. The child station become a parent station upon communication of the corrected system time and frequency values. The sequence may be repeated for as many stations as are deployed in the network.

67 Claims, 4 Drawing Sheets

METHOD AND APPARATUS FOR SEQUENTIALLY SYNCHRONIZED NETWORK

BACKGROUND OF THE INVENTION

1. Field of the Invention

The present invention is directed generally to a method and apparatus for timing and frequency generation and, more particularly, to a method and apparatus for sequentially synchronized timing and frequency generation in a communication network.

2. Description of the Background

In a wireless access system, the synchronization of time and frequency of transmissions are of paramount importance. Transmissions that are synchronized and share a known time and frequency reference provide improved system acquisition, simplified mobile station searching, improved handoff reliability, improved handset standby time, and facilitated location and position searching.

The majority of IS-95and Code Division Multiple Access (CDMA) deployments operate on GPS (Global Positioning System) time in order to gain a universal time reference for synchronization, and in order to gain the benefits which follow from synchronization. However, an increasing number of network operators find dependence on the GPS undesirable, and the need to make a GPS measurement at each base station adds increased cost and additional time consumption to the wireless network.

Therefore, the need exists for a wireless communication network that provides synchronization to a known time reference, while providing an alternative time reference to GPS time. A further need exists for a wireless communication network that provides simplified synchronization of all base stations in the network to a known frequency reference.

BRIEF SUMMARY OF THE INVENTION

The present invention is directed to a synchronized timing and frequency generator for a communication network. The synchronized timing and frequency generator includes a parent station which maintains system time and frequency values, a first time/frequency transfer unit which receives the system time value from the first parent (master) station and generates corrected system time and frequency values, and a first child (slave) station to which the first time/frequency transfer unit directly communicates the corrected system time and frequency values. This hierarchy of parent station-time transfer unit-child station-parent station may be repeated for as many stations as are deployed in a given wireless network. The corrected system time value may be generated using an adjustor which advances or retards a local free running clock at a child station.

In a preferred embodiment, the present invention is directed to a first time/frequency transfer unit coupled to a first child base station in a sequential time and frequency synchronization system. The first time/frequency transfer unit includes a receiver which acquires a pilot signal set, a demodulator which demodulates a SYNC message of a SYNC channel signal from the parent base station, determines the unit system time from the SYNC message, then advances the unit system time by a predetermined amount corresponding to the propagation delay between the parent station and the first time/frequency transfer unit in order to obtain absolute system time. The first time/frequency transfer unit then uses the absolute system time to generate a periodic pulse train with well defined edges used for controlling the timing of signals sent from the first child station. In a preferred embodiment, the period of the pulse train is an integer multiple of 1 second, and the SYNC message and SYNC channel correspond to the SYNC message and SYNC channel defined in the IS-95A standard. The generator used at the first time/frequency transfer unit to generate the periodic pulse train may include an adjustor which measures a time difference between the output of a free running local clock at the first child base station and the absolute system time determined by the first time/transfer unit, and then retards the output of the free running clock so as to synchronize the output of the free running clock with the absolute system time determined by the first time transfer unit.

Once the timing of the first child base station has been synchronized as described above, the first child base station uses the absolute system determined by the first time/frequency transfer unit to control the time synchronization of signals sent from the first child base station. In addition, the first child base station begins transmitting its own SYNC message on its SYNC channel in accordance with the absolute system time (as determined by the first time/frequency transfer unit) to a further child base station, thereby causing the first child base station to become a further (second) parent base station. The process described above is then repeated by a second time/frequency transfer unit coupled to the second child base station in order to synchronize the absolute system time used by the second child station with that of the first and second parent stations. The process is then preferably repeated for all further base stations in a communication system, thereby resulting in all such base stations being synchronized to a common absolute system time.

In the preferred embodiment, the time/frequency transfer units coupled to the child base stations are also used to sequentially establish frequency synchronization throughout the system of base stations. As mentioned above, the first time/frequency transfer unit includes a receiver which acquires a pilot signal from the parent base station. The pilot signal is transmitted from the first parent station at a first center frequency. The first time/frequency transfer unit coupled to the first child station receives the pilot signal from said first parent station and generates a corrected system frequency value by translating the center frequency of the received pilot signal to a predetermined reference center frequency (e.g., 10 MHz). The corrected system frequency value from the first frequency transfer unit is then communicated to the first child station and used to synchronize the frequency of the first child station with that of the parent station. Once the frequency of the first child base station has been synchronized as described above, the first child base station begins transmitting the translated pilot signal to a further child base station, thereby causing the first child base station to become a further (second) parent base station. The process described above is then repeated by a second time/frequency transfer unit coupled to the second child base station in order to synchronize the frequency used by the second child station with that of the first and second parent stations. The process is then preferably repeated for all further base stations in a communication system, thereby resulting in all such base stations being synchronized in frequency. In a preferred embodiment, the: pilot signals and pilot channels used for this aspect of the invention correspond to the pilot signals and channels defined in the IS-95A standard.

The present invention also includes a method of synchronizing timing generation in a communication network. The method includes receiving a system time value from a parent station at a time transfer unit, generating a corrected system time value at the time transfer unit, and transferring the corrected time value to a child station. The communicating may include comparing a free running local clock at said child station to the generated corrected system time value, and adjusting the free running local clock at the child station in accordance with the comparing.

The present invention solves problems experienced with the prior art because the present invention provides synchronization to common time and frequency references, without dependence on GPS timing as a reference at each base station. These and other advantages and benefits of the present invention will become apparent from the detailed description of the invention hereinbelow.

BRIEF DESCRIPTION OF THE SEVERAL VIEWS OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for, a clear understanding of the present invention, while eliminating, for purposes of clarity, many other elements found in a timing synchronization system. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
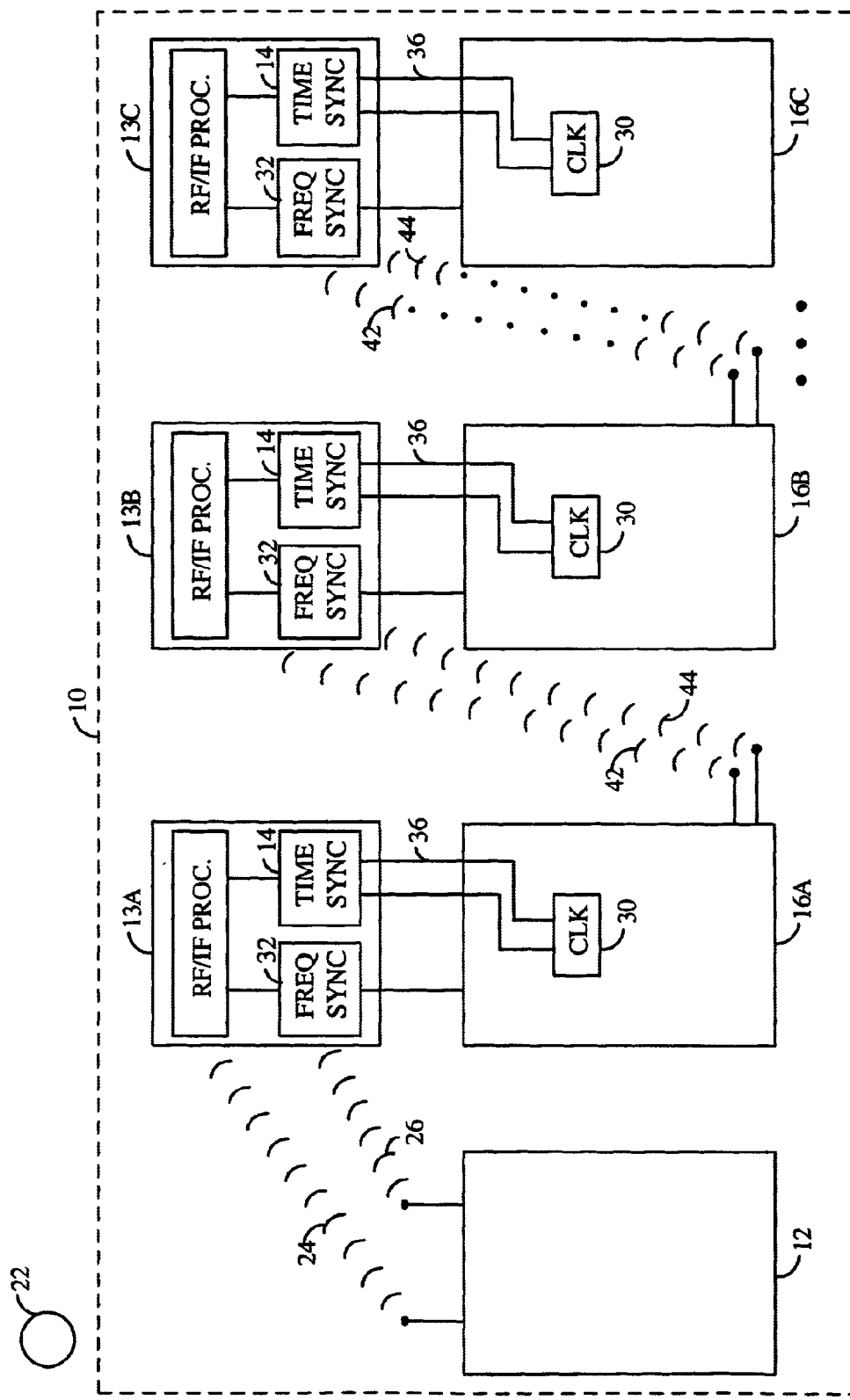
FIG. 1 is a block diagram illustrating a communication network that includes a sequential timing/frequency synchronization system in accordance with the present invention.

FIG. 1 is a block diagram illustrating a communication network 10 that includes a sequential timing and frequency synchronization system in accordance with the present invention. The timing/frequency synchronization system includes a first parent station 12, a first time/frequency transfer unit 13a, and a first child station 16a. The synchronized timing generator for a communication network may also include at least one secondary time transfer unit 13b and at least one secondary child station 16b. Parent station 12 and child stations 16a, 16b may, for example, represent base stations in a wireless access system such as a CDMA wireless access system operating in accordance with the IS-95A standard, incorporated herein by reference. Each time/frequency transfer unit 13a, 13b, 13c preferably contains an antenna that receives a pilot signal and a SYNC message from a parent base station, and processing circuitry for receiving, downconverting and demodulating the received signals. Each time/frequency transfer unit also preferably contains a time synchronization system 14 (shown in more detail in FIG. 2). As described more fully below, each time synchronization system 14 uses the system time transferred to the unit with the aforementioned SYNC message and a predetermined propagation delay time between the parent base station transmitting the SYNC message and the time/frequency unit receiving the SYNC message, to generate an absolute system time that is then used as the time reference in: the base station coupled to the time/frequency transfer unit. In addition, each time/frequency transfer unit preferably contains a frequency synchronization system 32 (shown in more detail in FIG. 3). As described more fully below, each frequency synchronization system 32 downconverts the center frequency of the pilot signal transmitted to the unit to a predetermined reference frequency in order to generate a signal that is then used as the frequency reference in the base station coupled to the time/frequency transfer unit.

The first parent station 12 maintains reasonably accurate time and frequency values. The time and frequency values maintained at the first parent station are the time and frequency values to which the communication network is to be synchronized. The system time value may be generated at the first parent station 12, or may be received at the first parent station from a remote source 22. The remote source 22 may be, for example, a GPS time source or a standard time source.

The first time/frequency transfer unit 13a receives a pilot signal 24 and a SYNC channel message 26 from the first parent station 12 and generates corrected system time and frequency values using these received signals. Each time/frequency transfer unit 13a, 13b, 13c may be formed from a mobile station in a wireless system (e.g., a CDMA mobile station operating in accordance with the IS-95A standard), wherein each mobile station is fixed relative to and co-located at its respective corresponding child station 16a, 16b, 16c, and is adapted to only receive forward link signals from base stations in the wireless system. The first child station 16a is electrically connected to the first time transfer unit 13a by a connector 36 such as, but not limited to, a coaxial cable, a fiber optic cable, or an antenna. The first time transfer unit 13a acquires the first parent station 12 by receipt of the pilot signal 24 from the first parent station 12. The first time transfer unit 13a also receives a SYNC message signal 26 containing timing information (e.g., the time value maintained in the first parent station 12) from the first parent station 12. The SYNC message 26 is preferably sent from the parent station 12 on a SYNC channel in accordance with format specified in the IS-95A standard.

Figure 2:
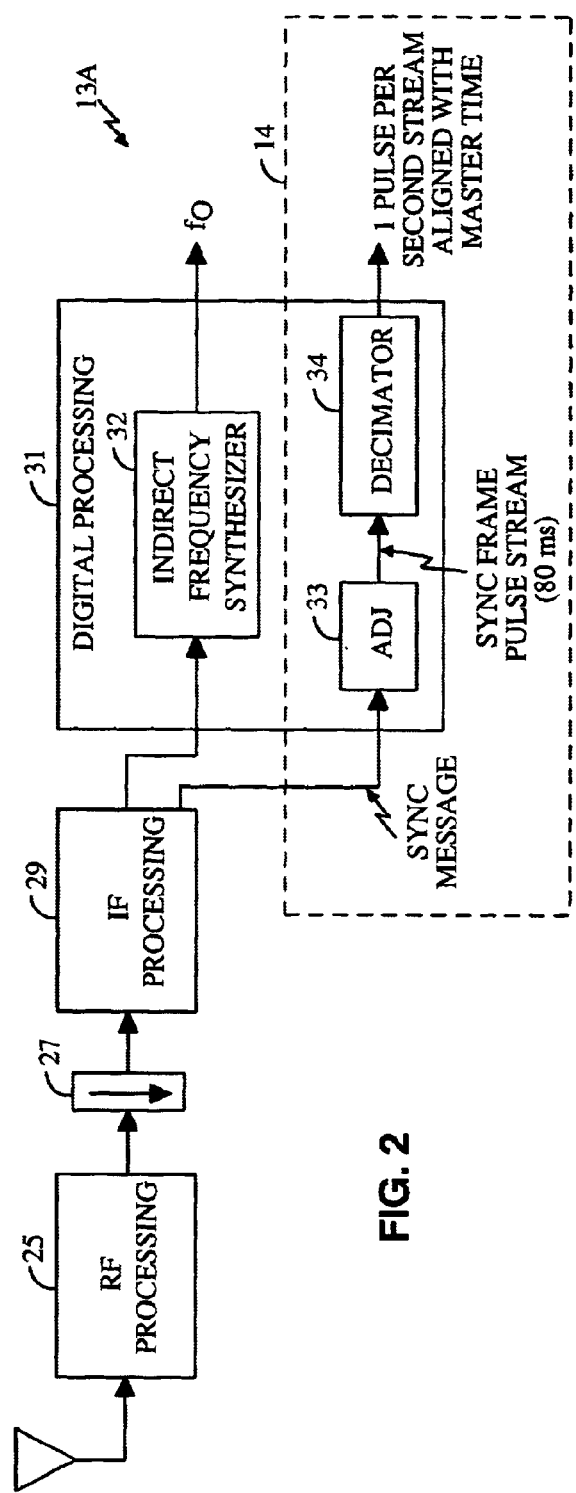
FIG. 2 is a block diagram illustrating components in an exemplary time/frequency transfer unit for synchronizing the absolute system time and frequency of a child base station to that of a parent base station, in accordance with the present invention.

Referring now to FIG. 2, there is a block diagram illustrating components in an exemplary time/frequency transfer unit 13a for synchronizing the absolute system time and frequency of a child base station to that of a parent base station, in accordance with the present invention. RF processing circuitry 25 is provided for receiving the pilot signal 24 and demodulating the SYNC message 26 from the parent station 12. The output of RF processing circuitry is downconverted (by downconverter 27) and then further processed by IF processing circuitry 29. A SYNC channel message (preferably of the form specified in section 6.6.1.3 of IS-95A incorporated herein by reference) Is then provided to timing adjustor 33. The timing of the SYNC message signal in the SYNC channel preferably is representative of the time maintained in the parent station 12. Adjustor 33 then determines a unit time ($SYS\_TIME_s$) associated with time/frequency transfer unit 13a in accordance with the IS-95A standard. In particular, the unit time ($SYS\_TIME_s$) is determined to be equal to the system time corresponding to 320 ms past the end of the last 80 ms superframe of the received SYNC channel message 26 minus the pilot PN sequence offset associated with pilot signal 24. The adjustor 33 then calculates an absolute system time by correcting the unit time ($SYS\_TIME_s$) by a predetermined propagation delay value corresponding to the propagation delay for a signal travelling between parent station 12 and time/frequency transfer unit 13a. Adjustor 33 then outputs a pulse stream (with a period of 80 ms) having pulses aligned with the determined absolute system time. In a particularly preferred embodiment, each pulse in the 80 ms pulse stream is also preferably aligned with a pilot rollover point on the SYNC channel (as such channel is defined in the IS95A standard) transmitted from the base station. The 80 ms pulse stream aligned with the absolute system time is then provided to a decimator 34 which in turn outputs a one (or any integer) pulse per second pulse stream aligned with the determined absolute system time.

Following calculation of the absolute system time value, adjustor 33 measures the time difference between the clock pulse of a free running clock 30 in child base station 16a and that of the determined absolute system time value, and adjusts the pulsing of the free running clock 30 to remove the time difference. In other words, the adjustor 33 adjusts the clock of the first child station 16 by advancing or retarding the free running local clock 30 at the first child station 16a to match the pulse train output by decimator 34 corresponding to the determined absolute time value.

In a preferred embodiment of the present invention, repetition of adjustment occurs at an assigned time interval for the first time/frequency transfer unit 13a and first child station 16a correspondence. After the correct absolute system time value has been determined by the first time/frequency transfer unit 13a, and, after clock 30 at the first child station 16a has been adjusted in accordance with the absolute system time, the first child station 16a becomes a second parent station 16a (for purposes of 1synchronizing time through network 10) because the station 16a is now synchronized to the same absolute system time as parent station 12. As described below, after child station 16a is synchronized with the absolute system time maintained in parent station 12, second parent station 16a may begin transmitting a SYNC message signal representative of the absolute system time to a second time/frequency transfer unit 13b coupled to a further child station 16b.

The synchronized timing generator for a communication network 10 optionally includes a second time/frequency transfer unit 13b. Time/frequency transfer unit 13b functions substantially in accordance with time/frequency transfer unit 13a, except unit 13b is coupled to base station 16b and receives pilot and SYNC message signals from parent station 16a as opposed to parent station 12. Thus, time/frequency transfer unit 13b includes RF processing circuitry 25 for receiving a pilot signal 42 and a SYNC message 44 from the second parent station 16a. The output of RF processing circuitry is downconverted (by downconverter 27) and then further processed by IF processing circuitry 29. A SYNC channel message (preferably of the form specified in section 6.6.1.3 of IS-95A) is then provided to timing adjustor 33 in time/frequency transfer unit 13b. The timing of the SYNC message signal in the SYNC channel preferably is representative of the absolute system time maintained in the parent station 16a. Adjustor 33 then determines a unit time ($SYS\_TIME_s$) associated with time/transfer unit 13b in accordance with the IS-95A standard. In particular, the unit time ($SYS\_TIME_s$) is determined by time/frequency transfer unit 13b to be equal to the system time corresponding to 320 ms past the end of the last 80 ms superframe of the received SYNC channel message 44 minus the pilot PN sequence offset associated with pilot signal 42. The adjustor 33 in unit 13b then calculates an absolute system time by correcting the unit time ($SYS\_TIME_s$) by a predetermined propagation delay value corresponding to the propagation delay for a signal travelling between parent station 16a and time/frequency transfer unit 13b. Adjustor 33 in time/frequency transfer unit 13b then outputs a pulse stream (with a period of 80 ms) having pulses aligned with the determined absolute system time. In a particularly preferred embodiment, each pulse in the 80 ms pulse stream is also preferably aligned with a pilot rollover point on the SYNC channel (as such channel is defined in the IS-95A standard) transmitted from the base station. The 80 ms pulse stream aligned with the absolute system time is then provided to a decimator 34 in time/frequency transfer unit 13b which in turn outputs a one (or any integer) pulse per second pulse stream aligned with the determined absolute system time.

Following calculation of the absolute system time value, adjustor 33 in unit 13b measures the time difference between the clock pulse of a free running clock 30 in child base station 16b and that of the determined absolute system time value, and adjusts the pulsing of the free running clock 30 to remove the time difference. In other words, the adjustor 33 in unit 13b adjusts the clock of the second child station 16b by advancing or retarding the free running local clock 30 at the second child station 16b to match the pulse train output by decimator 34 corresponding to the determined absolute time value. In a preferred embodiment of the present invention, repetition of adjustment occurs at an assigned time interval for the second time transfer unit 13b and second child station 16b correspondence. After the correct absolute system time value has been determined by the second time transfer unit 13b, and, after clock 30 at the second child station 16b has been adjusted in accordance with the absolute system time, the second child station 16b becomes a third parent station 16b (for purposes of synchronizing time through network 10) because the station 16b is now synchronized to the same absolute system time as parent stations 12 and 16a. As described below, after station 16b is synchronized with the absolute system time maintained in parent station 16a, third parent station 16b may begin transmitting a SYNC message signal representative of the absolute system time to a third time/frequency transfer unit 13c coupled to a further child station 16c.

The above process may then optionally be repeated using a third time/frequency transfer unit 13c and a third child base station 16c to transfer the absolute system time to station 16c, and so on, until all base stations in the communication system 10 are synchronized to the same common absolute system time.

Figure 3:
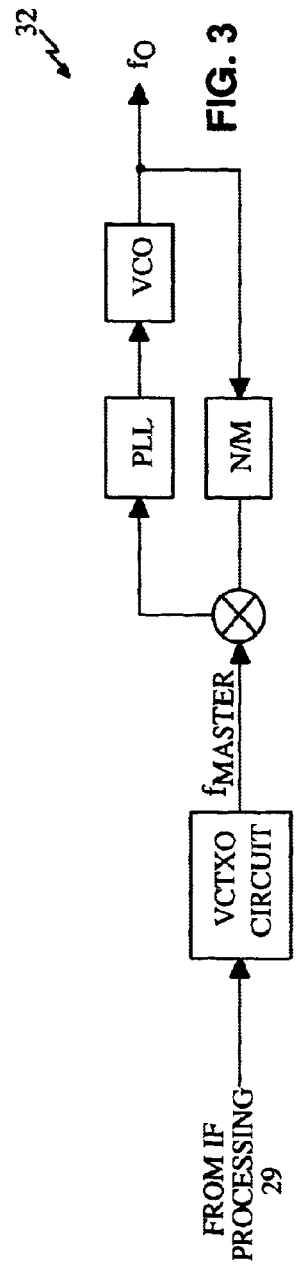
FIG. 3 is a block diagram showing in more detail components in an exemplary time/frequency transfer unit for synchronizing the frequency of a child base station to that of a parent base station, in accordance with the present invention.

Referring now to FIG. 3, there is a block diagram illustrating the components of a frequency synthesizer circuit 32 included in time/frequency transfer unit 13a for synchronizing the frequency of a child base station, in accordance with the present invention. The pilot signal 26 sent from the parent station 12 is preferably a pilot signal defined in accordance with the IS-95A standard. Frequency synthesizer circuit 32 downconverts the center frequency of the pilot signal 26 sent from parent station 12 to a common reference center frequency ($f_{master}$). In a preferred embodiment of the present invention, repetition of adjustment of the center frequency of the received pilot signal occurs at an assigned time interval for the first time transfer unit 13a and first child station 16a correspondence. After the center frequency of the pilot signal has been translated to the correct system frequency reference, the first child station 16a becomes a second parent station 16a (for purposes of synchronizing frequency through network 10) because the station 16a is now synchronized to the reference center frequency described above. As described below, after station 16a is synchronized with the reference center frequency, second parent station 16a may begin transmitting a pilot signal 44 having a center frequency aligned with the reference frequency to a second time/frequency transfer unit 13b coupled to a further child station 16b.

The synchronized frequency generator for a communication network 10 optionally includes a second time/frequency transfer unit 13b with a further frequency synthesizer circuit 32. Time/frequency transfer unit 13b functions substantially in accordance with time transfer unit 13a, except time/frequency transfer unit 13b is coupled to base station 16b and receives pilot signal 42 from parent station 16a as opposed to parent station 12. Thus, unit 13b includes RF processing circuitry 25 for receiving a pilot signal 42 and a SYNC message 46 from the second parent station 16a. The pilot signal 26 sent from the parent station 12 is preferably a pilot signal defined in accordance with the IS-95A standard. Frequency synthesizer circuit 32 In unit 13b downconverts the center frequency of the pilot signal 42 sent from parent station 16a to the common reference center frequency ($f_{master}$). In a preferred embodiment of the present invention, repetition of adjustment of the center frequency of the received pilot signal occurs at an assigned time interval for the second time transfer unit 13b and second child station 16b correspondence. After the center frequency of the pilot signal has been translated to the correct system frequency reference, the second child station 16b becomes a third parent station 16b (for purposes of synchronizing frequency through network 10) because the station 16b is now synchronized to the reference center frequency described above. After station 16b is synchronized with the reference center frequency, third parent station 16b may begin transmitting a pilot signal 42 having a center frequency aligned with the reference frequency to a third time/frequency transfer unit 13c coupled to a further child station 16c.

The above process may then optionally be repeated using a third time/frequency transfer unit 13c and a third child base station 16c to transfer the frequency reference to station 16c, and so on, until the pilot signals transmitted from the base stations in the communication system 10 are synchronized to the same common center reference frequency.

In a preferred embodiment, each time/frequency transfer unit 13a, 13b, 13c is assigned to search for a specific unique sequence of two or more pilot signals associated with its corresponding parent station. Additionally, each time/frequency transfer unit 13a, 13b, 13c preferably operates in a non-continuous mode wherein a time/frequency transfer unit periodically "wakes-up" at predetermined intervals to acquire the relevant signals from its parent base station and transfer time and frequency to its child base station, and then goes back to sleep. Alternatively, each time/frequency transfer unit 13a, 13b, 13c may operate in a continuous mode wherein a time/frequency transfer unit continuously acquires the relevant signals from its parent base station and transfers time and frequency to its child base station.

Although in the preferred embodiment, units 13a, 13b and 13c operate to synchronize both time and frequency throughout network 10, it will be understood by those skilled in the art that units 13a, 13b and 13c may be used to synchronize only time or only frequency (rather than both parameters) throughout network 10.

Figure 4:
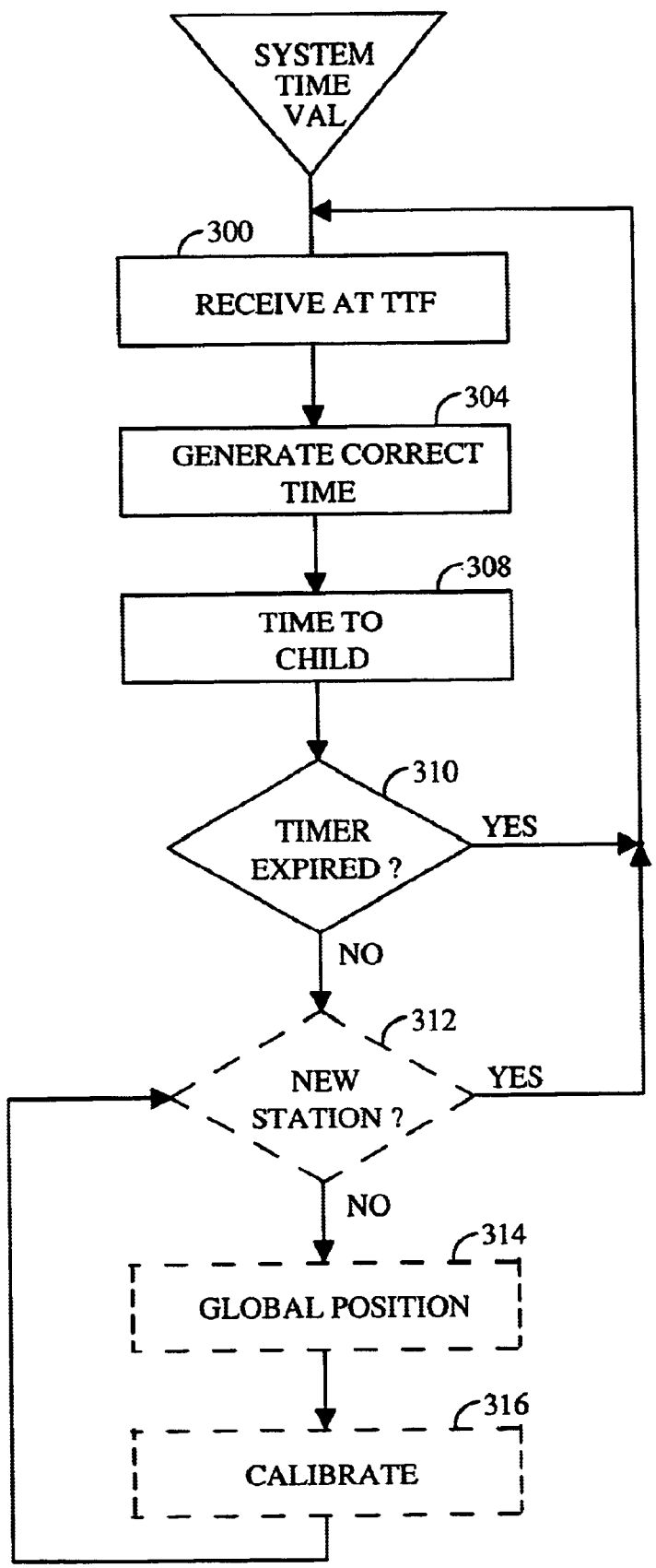
FIG. 4 is a flow diagram illustrating a method of synchronizing timing generation in a communication network, in accordance with the present invention.

FIG. 4 is a flow diagram illustrating a method of synchronizing timing generation in a communication network. The method of synchronizing timing generation in a communication network includes the steps of receiving a system time value, generating a corrected system time value, and communicating the corrected time value.

At step 300, a system time value from a parent station is received at a time transfer unit. In a preferred embodiment of the present invention, the parent station is a mobile telephone base station. The system time value may be generated at the parent station. In an alternate embodiment of the present invention, the system time value may be generated at a remote time generator, and transmitted to the parent station. Step 300 may include receiving the system time value from the parent station by demodulating a synchronous channel signal from the parent station. The synchronous channel signal includes the system time value. The demodulating may be performed after receipt of a pilot signal from the parent station.

At step 304, a corrected system time value is generated at the time transfer unit as described above. This corrected system time value is generated as described above by adding a predetermined propagation delay for transmission from the parent station to the time transfer unit, to the system time value transferred from said parent station.

At step 308, the corrected time value is communicated to a child station. Upon communication of the corrected time value, an adjustment of the free running local clock at the child station is performed according to the comparison of the actual value of the free running local clock to the added value, whereby the child station becomes a parent station for purposes of time synchronization. The corrected time may be communicated from the time transfer unit to the child station via a direct electrical connection. This direct electrical connection communication may be performed using transmission devices such as, but not limited to, a coaxial cable, a fiber optic cable, and an antenna.

At step 310, steps 300, 304, and 308 are repeated at an assigned time interval.

At optional step 312, steps 300, 304, 308, and 310 are repeated for a plurality of secondary time transfer units, each in sequence. The corrected system time value is sequentially received at the plurality of time transfer units. Each of the plurality of time transfer units generates a recorrected time using a known propagation delay between a previous parent station in the sequence and a current child station in the sequence. The propagation delay may be determined by measuring the round-trip delay between the two stations (using, for example, the method disclosed in co-pending U.S. Pat. No. 6,081,229 entitled "System and Method for Determining the Position of a Wireless CDMA Transceiver," filed on Mar. 17, 1998, and issued to Klein S. Gilhousen et al. on Jun. 27, 2000, assigned to the assignee of the present invention and incorporated herein by reference), and then dividing the round-trip delay by one-half to determine the "one-way" or propagation delay. The recorrected time is adopted at each of the plurality of secondary child stations in sequence. The plurality of secondary child stations that are connected to the plurality of time transfer units thus sequentially become a plurality of secondary parent stations. Each secondary parent station then, in turn, serves as the transmitter of the newly corrected time value to a new secondary time transfer unit.

At optional step 314, a global positioning of each secondary time transfer unit may be calculated using three spatial coordinates and the system real time value at a given station. These spatial coordinates, x, y, and z, may be received from three global positioning satellites. The use of the system real time value as the t coordinate eliminates the need for a signal from a fourth satellite to calculate global position.

At optional step 316, a calibration is performed at a given time interval to account for variations in conditions pertaining to the predetermined propagation delay which have occurred since the initial measurement of the predetermined propagation delay.

Figure 5:
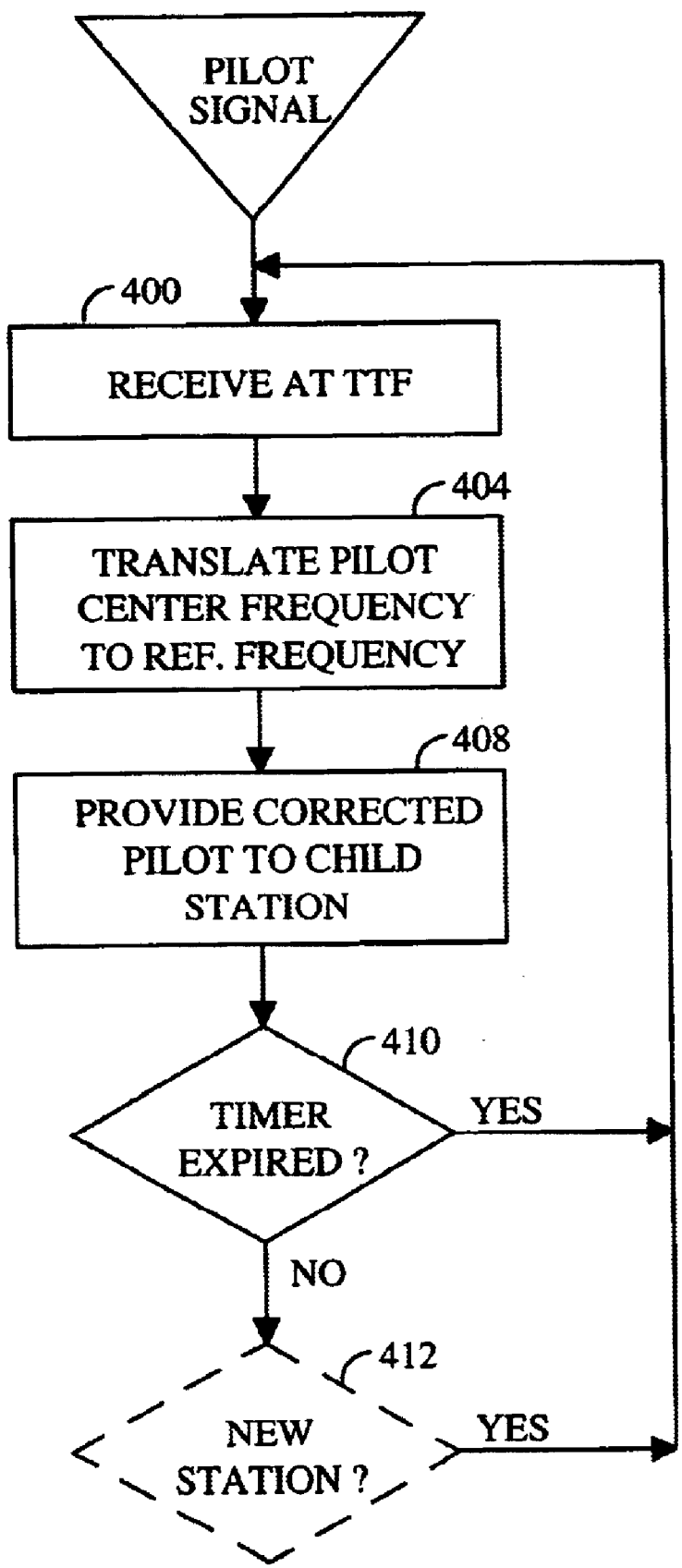
FIG. 5 is a flow diagram illustrating a method of synchronizing frequency in a communication network, in accordance with the present invention.

FIG. 5 is a flow diagram illustrating a method of synchronizing frequency generation in a communication network. The method of synchronizing frequency generation in a communication network includes the steps of receiving a pilot signal having a center frequency value, translating the center frequency of the received pilot signal to a reference frequency, and communicating the translated pilot signal with the corrected center frequency to a child station.

At step 400, a pilot signal having a center frequency value is transmitted from a parent station and received at a frequency transfer unit. In a preferred embodiment of the present invention, the parent station is a mobile telephone base station. At step 404, a corrected pilot signal Is generated at the frequency transfer unit as described above by translating the center frequency of the received pilot signal to a reference frequency. At step 408, the corrected pilot signal with the reference center frequency is communicated to a child station. Upon communication of the corrected pilot signal, the child station becomes a parent station for purposes of frequency synchronization. The corrected pilot may be communicated from the frequency transfer unit to the child station via a direct electrical connection. This direct electrical connection communication may be performed using transmission devices such as, but not limited to, a coaxial cable, a fiber optic cable, and an antenna.

At step 410, steps 400, 404, and 408 are repeated at an assigned time interval.

At optional step 412, steps 400, 404, 408, and 410 are repeated for a plurality of secondary frequency transfer units, each in sequence. The corrected pilot with the reference center frequency value is sequentially received at the plurality of frequency transfer units. Each of the plurality of frequency transfer units generates a recorrected pilot using the reference frequency as described above. The recorrected pilot is adopted at each of the plurality of secondary child stations in sequence. The plurality of secondary child stations that are connected to the plurality of frequency transfer units thus sequentially become a plurality of secondary parent stations. Each secondary parent station then, in turn, serves as the transmitter of the newly corrected pilot frequency value to a new secondary time transfer unit.

Those of ordinary skill in the art will recognize that many modifications and variations of the present invention may be implemented. For example, the present invention may be applied to transfer time and frequency throughout any communication system, and it will therefore be understood by those skilled in the art that application of the present invention is not limited to communication systems such as those described above that use CDMA modulation in accordance with the IS95A standard. The foregoing description and the following claims are intended to cover all such modifications and variations.

What is claimed is:

1. A synchronized timing generator for a communication network having a first parent station which maintains a system time value, the synchronized timing generator comprising:
   a first time transfer unit which receives the system time value from said first parent station and generates a corrected system time value using a first known propagation delay, wherein the known propagation delay is a function of the distance between the first parent station and the first time transfer unit; and
   a first child station to which said first time transfer unit directly communicates the corrected system time value, whereby said first child station becomes a second parent station,
   wherein said first time transfer unit includes a pilot signal receiver which acquires the first parent station by receipt of a pilot signal from said first parent station.

2. The synchronized timing generator for a communication network of claim 1, wherein the system time value is generated at said first parent station.

3. The synchronized timing generator for a communication network of claim 1, wherein the system time value is received from a remote source at said first parent station.

4. The synchronized timing generator for a communication network of claim 3, wherein the remote source is a global position system time measurement.

5. The synchronized timing generator for a communication network of claim 1, wherein said first parent station is a mobile telephone base station.

6. The synchronized timing generator for a communication network of claim 1, wherein said first child station is a mobile telephone base station.

7. The synchronized timing generator for a communication network of claim 1, wherein said first time transfer unit includes a demodulator which receives the system time value by demodulating a synchronous channel signal received from said first parent station.

8. The synchronized timing generator for a communication network of claim 7, wherein the synchronous channel signal comprises a uniform series of electrical pulses.

9. The synchronized timing generator for a communication network of claim 8, wherein the electrical pulses occur every 80 milliseconds.

10. The synchronized timing generator for a communication network of claim 8, wherein the electrical pulses occur at a variable rate.

11. The synchronized timing generator for a communication network of claim 7, wherein the corrected system time value is generated in response to the predetermined propagation delay and the demodulated synchronous channel signal.

12. The synchronized timing generator for a communication network of claim 1, further comprising an adjustor coupled to said first child station.

13. The synchronized timing generator for a communication network of claim 12, wherein said adjustor advances or retards a free running local clock at said first child station.

14. The synchronized timing generator for a communication network of claim 12, wherein said adjustor includes an adjustor circuit which measures a time difference between a free running clock at said first child station and the corrected system time value, and wherein said adjustor circuit adjusts the free running clock to remove the time difference.

15. The synchronized timing generator for a communication network of claim 14, wherein said adjustor performs adjustment of the free running clock at a pre-assigned time interval.

16. The synchronized timing generator for a communication network of claim 1, wherein the system time value is used as a time coordinate for a global positioning measurement.

17. The synchronized timing generator for a communication network of claim 1, further comprising:
   at least one secondary time transfer unit, which sequentially receives the corrected system time value from a parent station and generates a recorrected time using a known propagation delay; and
   at least one secondary child station, wherein each secondary child station is correspondent to one of said secondary time transfer units, which receives the recorrected system time value from said correspondent secondary time transfer unit, whereby said secondary child station becomes a further parent station.

18. The synchronized timing generator for a communication network of claim 17, wherein each secondary child station is a mobile telephone base station.

19. The synchronized timing generator for a communication network of claim 17, wherein each parent station is a mobile telephone base station.

20. The synchronized timing generator for a communication network of claim 17, wherein said at least one secondary time transfer unit includes a pilot signal receiver which acquires said second parent station by receipt of a pilot signal from said second parent station.

21. The synchronized timing generator for a communication network of claim 17, wherein said at least one secondary time transfer unit includes a demodulator which receives the corrected system time value by demodulating a synchronous channel signal received from said first secondary parent station.

22. The synchronized timing generator for a communication network of claim 21, wherein the recorrected system time value is generated in response to the predetermined propagation delay and the demodulated synchronous channel signal.

23. The synchronized timing generator for a communication network of claim 17, wherein said at least one secondary time transfer unit includes a pilot signal receiver which acquires a correspondent parent station by receipt of a pilot signal unique to said correspondent parent station.

24. The synchronized timing generator for a communication network of claim 17, further comprising at least one adjustor coupled to each of said secondary child stations.

25. The synchronized timing generator for a communication network of claim 24, wherein said at least one adjustor advances or retards a local free running clock at said secondary child station.

26. The synchronized timing generator for a communication network of claim 24, wherein said at least one adjustor includes an adjustor circuit which measures a time difference between a free running clock at said secondary child station and the recorrected system time value, and wherein said adjustor circuit adjusts the free running clock to remove the time difference.

27. The synchronized timing generator for a communication network of claim 26, wherein said adjustor performs adjustment of the free running clock at a pre-assigned time interval.

28. The synchronized timing generator for a communication network of claim 24, wherein said at least one secondary child station becomes a further parent station after receipt of an adjustment from said at least one adjustor.

29. The synchronized timing generator for a communication network of claim 17, wherein the corrected system time value from said second parent station is sequentially received at said at least one secondary time transfer unit from at least one directional antenna.

30. The synchronized timing generator for a communication network of claim 17, wherein the corrected system time value from said second parent station is sequentially received at said at least one secondary time transfer unit from a transmission device selected from the group consisting of a coaxial cable, a fiber optic cable, a laser light transmitter, and a satellite transmitter.

31. The synchronized timing generator for a communication network 6f claim 17, wherein each of said at least one secondary child stations is electrically connected to each of said correspondent secondary time transfer units.

32. The synchronized timing generator for a communication network of claim 31, wherein each of said secondary child stations is electrically connected to each of said correspondent secondary time transfer units using a connection selected from the group consisting of a coaxial cable, a fiber optic cable, and an antenna.

33. The synchronized timing generator for a communication network of claim 17, wherein the recorrected system time value is used as a time coordinate for a global positioning measurement.

34. A time transfer unit for connection to a base station in a sequential time synchronization system, comprising:
   a receiver which acquires a pilot signal set;
   a demodulator which demodulates a synchronous channel signal from a primary base station assigned from the pilot signal set and extracts timing information therefrom; and
   an adjustor which adds a predetermined propagation delay to the timing information and generates an accurate clock pulse, which is directly communicated to a connected base station.

35. The time transfer unit for connection to a base station in a sequential time synchronization system of claim 34, wherein the pilot signal set includes two or more pilot signals.

36. The time transfer unit for connection to a base station in a sequential time synchronization system of claim 35, wherein the pilot signal set has a sequence, and wherein the receiver includes a pilot signal receiver which acquires the pilot signal set according to the sequence.

37. The time transfer unit for connection to a base station in a sequential time synchronization system of claim 34, wherein the predetermined propagation delay is a time delay for a transmission travelling between the primary base station and the time transfer unit.

38. The time transfer unit for connection to a base station in a sequential time synchronization system of claim 34, wherein the accurate clock pulse is a retardation or an advancement of a local free running clock at the connected base station.

39. The time transfer unit for connection to a base station in a sequential time synchronization system of claim 34, further comprising a transmission device which directly communicates the accurate clock pulse to the connected base station.

40. The time transfer unit for connection to a base station in a sequential time synchronization system of claim 39, wherein the transmission device is chosen from the group consisting of a coaxial cable, a fiber optic cable, and an antenna.

41. The time transfer unit for connection to a base station in a sequential time synchronization system of claim 34, wherein the synchronous channel signal comprises a uniform signal of electrical pulses.

42. The time transfer unit for connection to a base station in a sequential time synchronization system of claim 41, wherein the electrical pulses occur every 80 milliseconds.

43. The time transfer unit for connection to a base station in a sequential time synchronization system of claim 41, wherein the electrical pulses occur at a variable rate.

44. The time transfer unit for connection to a base station in a sequential time synchronization system of claim 34, wherein said adjustor measures a time difference between the accurate clock pulse and a free running local clock at the connected base station.

45. The time transfer unit for connection to a base station in a sequential time synchronization system of claim 44, wherein said adjustor adjusts the free running local clock at the connected base station by advancing or retarding the free running local clock at the connected base station.

46. The time transfer unit for connection to a base station in a sequential time synchronization system of claim 45, wherein said adjustor retards or advances the free running clock at a pre-assigned time interval.

47. The time transfer unit for connection to a base station in a sequential time synchronization system of claim 34, wherein the receiver receives from a transmission device.

48. The time transfer unit for connection to a base station in a sequential time synchronization system of claim 47, wherein the transmission device is chosen from the group consisting of a directional antenna, a coaxial cable, a fiber optic cable, a laser light transmitter, and a satellite transmitter.

49. The time transfer unit for connection to a base station in a sequential time synchronization system of claim 34, wherein the receiver operates continuously, or may take measurements only at assigned intervals.

50. The time transfer unit for connection to a base station in a sequential time synchronization system of claim 34, wherein the receiver operates at assigned time intervals.

51. A method of synchronizing timing generation in a communication network, comprising:
   receiving a system time value from a parent station at a time transfer unit; and
   generating a corrected system time value at said time transfer unit using a known propagation delay and the system time value received from said parent station, wherein the known propagation delay is a function of the distance between the parent station and the parent station; and
   communicating the corrected time value to a child station, whereby said child station becomes a parent station;
   generating the system time value at a time generator; and
   receiving the system time value at said parent station.

52. The method of synchronizing timing generation in a communication network of claim 51, further comprising generating the system time value at said parent station.

53. The method of synchronizing timing generation in a communication network of claim 51, further comprising repeating said receiving, generating, and communicating for a plurality of secondary time transfer units, whereby said plurality of secondary child stations sequentially become a plurality of secondary parent stations.

54. The method of synchronizing timing generation in a communication network of claim 51, further comprising:
   receiving sequentially at a plurality of time transfer units the corrected system time value;
   generating at each of the plurality of time transfer units a recorrected time using a known propagation delay between a previous parent station in the sequence and a current child station in the sequence; and
   adopting the recorrected time at a plurality of secondary child stations, wherein each secondary child station is correspondent to one of said plurality of secondary time transfer units, whereby said secondary child stations become secondary parent stations.

55. The method of synchronizing timing generation in a communication network of claim 51, further comprising calculating at said parent station a global positioning of said parent station using three spatial coordinates and the system time value.

56. The method of synchronizing timing generation in a communication network of claim 55, wherein the spatial coordinates are received from at least one global positioning satellite.

57. The method of synchronizing timing generation in a communication network of claim 51, wherein the predetermined propagation delay is a time delay for a signal travelling between said parent station and said time transfer unit.

58. The method of synchronizing timing generation in a communication network of claim 51, wherein said generating is performed by adding the predetermined propagation delay and the system time value.

59. The method of synchronizing timing generation in a communication network of claim 51, wherein said communicating is a direct electrical connection communicating.

60. The method of synchronizing timing generation in a communication network of claim 59, wherein said direct electrical connection is selected from the group consisting of a coaxial cable, a fiber optic cable, and an antenna.

61. The method of synchronizing timing generation in a communication network of claim 51, wherein said receiving includes demodulating a synchronous channel signal from said parent station after receiving a pilot signal from said parent station.

62. The method of synchronizing timing generation in a communication network of claim 51, wherein said communicating includes:
   comparing a free running local clock at said child station to said generating of the corrected system time value; and
   adjusting the free running local clock at said child station in accordance with said comparing.

63. The method of synchronizing timing generation in a communication network of claim 62, further comprising repeating said receiving, said generating, and said communicating at an assigned time interval.

64. The method synchronizing timing generation in a communication network of claim 51, further comprising calibrating at a given time interval to recalibrate the predetermined propagation delay.

65. A synchronized frequency generator for a communication network, comprising:
   a first parent station which transmits a pilot signal at a first center, frequency;
   a first frequency transfer unit which receives the pilot signal from said first parent station and generates a corrected system frequency value by translating the center frequency of the received pilot signal to a reference center frequency;
   a first child station to which said first frequency transfer unit directly communicates the corrected system frequency value, whereby said first child station becomes a second parent station;

a second frequency transfer unit, which receives the translated pilot signal from said second parent station and generates a further corrected system frequency value by translating a center frequency of the pilot signal from the second parent station to the reference frequency; and a second child station which receives the corrected system frequency value from said second time transfer unit, whereby said second child station becomes a third parent station.

66. The synchronized frequency generator for a communication network of claim 65, wherein the reference frequency is 10 MHz.

67. In a wireless communication system, a method comprising:

determining a system time value at a first base station;

transmitting the system time value to a second base station;

generating a second system time value based on the system time value and a predetermined time delay between the first base station and the second base station;

transmitting the second system time value to a third base station; and generating a third system time value based on the second system time value and a second predetermined time delay between the second base station and the third base station.

* * * * *